United States Patent [19]

Ames

[11] 4,086,121

[45] Apr. 25, 1978

[54] SELF-CONTAINED DRY WALL TAPER

[76] Inventor: Robert G. Ames, 2150 Forest View, Hillsborough, Calif. 94810

[21] Appl. No.: 791,068

[22] Filed: Apr. 26, 1977

[51] Int. Cl.$^2$ .......................... B32B 31/00; B44C 7/02

[52] U.S. Cl. ..................................... 156/526; 156/575; 156/577; 156/579; 226/127; 226/162

[58] Field of Search ............... 156/574, 575, 577, 578, 156/543, 523, 524, 526, 579; 226/53, 58, 71, 91, 92, 127, 162, 165; 271/33

[56] References Cited

U.S. PATENT DOCUMENTS

| | | | |
|---|---|---|---|
| 2,502,499 | 4/1950 | Ames | 156/574 |
| 2,815,142 | 12/1957 | Ames | 156/526 |
| 3,260,638 | 7/1966 | Hoveland | 156/526 |
| 3,890,191 | 6/1975 | Mayer | 156/577 X |

*Primary Examiner*—William A. Powell
*Assistant Examiner*—M. G. Wityshyn
*Attorney, Agent, or Firm*—William R. Piper

[57] ABSTRACT

A self-contained dry wall taper has a hollow elongated body for holding mastic and supports a roll of tape with tape feeding means to deliver the tape to tape applying wheels that in turn apply it to cover a joint between two wall board sections.A piston is slidably mounted in the hollow body and is automatically moved by a mechanism actuated by the rotating wheels, as they are moved over the wall board surface, to force a layer of mastic onto the tape just prior to it being applied to the surface. Novel tape feeding and tape cutting means are actuated by a single sleeve which is moved forwardly on the hollow body to initially feed the tape into engagement with the tape applying wheels and is moved rearwardly to actuate the tape-cutting mechanism for cutting the tape. A tape creasing disc can be swung into operative position by the operator when the tape is to be applied to an inner corner of a room and it is desired to provide a median crease along the length of the tape and for forcing this crease into the room corner as the mastic and tape are applied.

4 Claims, 21 Drawing Figures

SELF-CONTAINED DRY WALL TAPER

SUMMARY OF THE INVENTION

An object of my invention is to provide an improvement over the Robert G. Ames U.S. Pat. No. 2,815,142, on a self-contained dry wall taper, issued Dec. 3, 1957. The spring biased tape advancing pin of the patent has been changed to one that will not drag on the tape on its return movement and will have no tendency to move the tape in a reverse direction in the tape guide. Moreover, the tape feeding means for feeding the tape to the tape applying wheels can be actuated for positively moving the tape for a predetermined length or for shorter portions thereof.

The chain for moving the tape-cutting blade transversely across the tape when it is desired to sever the tape may become slack through wear. I provide novel means for taking up this slack when it becomes necessary. The patent shows an enlongated exposed coil spring for returning the tape-cutting knife after its cutting operation. I substitute a torsional spring and house it within a casing to take up less space and to protect the spring. The force of the spring can be adjusted. The tape cutting blade travels in a transverse guide slot rather than along the single edge of the tape guide. This results in a positive cutting of the tape whereas in the patented tool the tape might bunch up during the cutting operation and jam the tape guide.

When the taper is moved upwardly along a vertical wall board joint and the hollow body is almost in a vertical position at the end of its tape applying movement, because the head of the taper is now disposed adjacent to the ceiling, as soon as the operator severs the tape, the weight of the mastic on the piston in the hollow body has a tendency to move the piston downwardly in the body and through its operative connection with the tape applying wheels, to reverse the rotation of the wheels and permit the piston to move downwardly. I provide novel means for applying a continuous braking force on the rim of one of the wheels to prevent such reverse action. Also this braking force can be manually adjusted to suit the desire of the operator so that the wheels will not rotate too freely even while he is applying the tape and mastic to a wall board joint.

A further object of my invention is to provide an automatic release of the type applying wheels from the cable that operatively connects these wheels to the piston so as to prevent the cable from breaking as it pulls the piston to the end of its mastic feeding stroke at the end of the body.

BRIEF DESCRIPTION OF DRAWINGS

FIG. 3A is an enlarged section along the line 3A—3A of FIG. 3 and shows the means for taking up slack in the chain that moves the tape cutter.

FIG. 4A is an enlarged section taken along the line 4A—4A of FIG. 4 and illustrates the tape moving pin engaging with the tape.

FIG. 4B is a section on the same scale as FIG. 4A, and is taken along the line 4B—4B of FIG. 4, and shows the arcuate position of the rubber tip as it travels along the perforated track in the direction of the arrow for maintaining the pin in positive engagement with the tape for moving it toward the tape applying wheels.

FIG. 4C is a view similar to FIG. 4B, but shows the position of the rubber tip on its return travel along the perforated track for swinging the pin out of engagement with the tape so that the tape will not be moved in a reverse direction.

FIG. 5A is an enlargement of the circled portion 5A in FIG. 5, and illustrates the tape cutting knife travelling in a transverse slot formed by the spaced apart edges of two adjacent plates both lying in the same plane.

FIG. 7A is an enlarged view of the torsional spring for retracting the tape creasing disc and is taken along the line 7A—7A of FIG. 7.

In carrying out my invention, I will describe in sequence: the general structure of the tool; the manual and automatic positive feeding of the tape; the tape feeding means; the tape creasing disc; the tape cutting mechanism; the improved tape cutting mechanism; and the mechanism for manually ajusting the braking tension applied by the back-up roller on the tape feeding wheels.

GENERAL STRUCTURE OF TOOL

Figure 1:
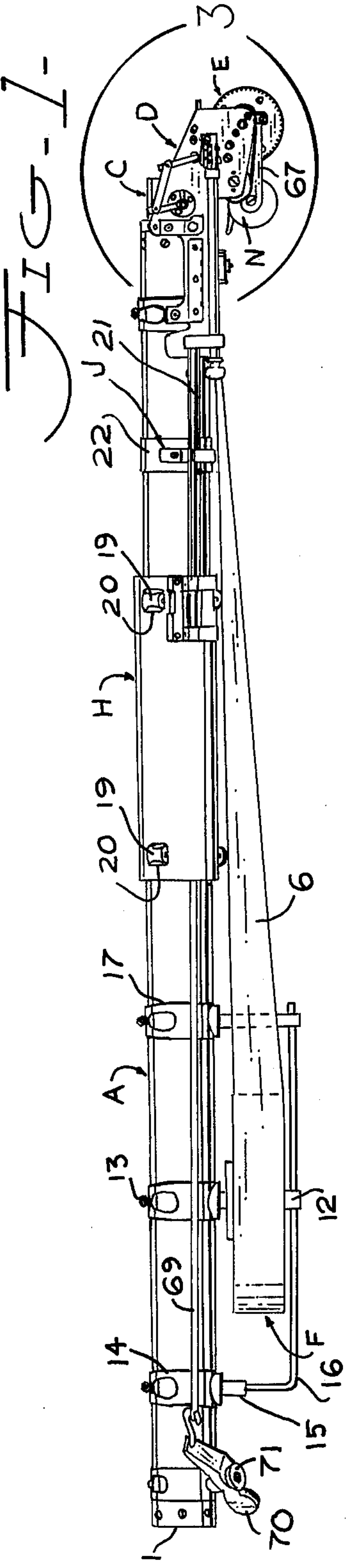
FIG. 1 is a side elevation of my self-contained dry wall taper.
Figure 2:
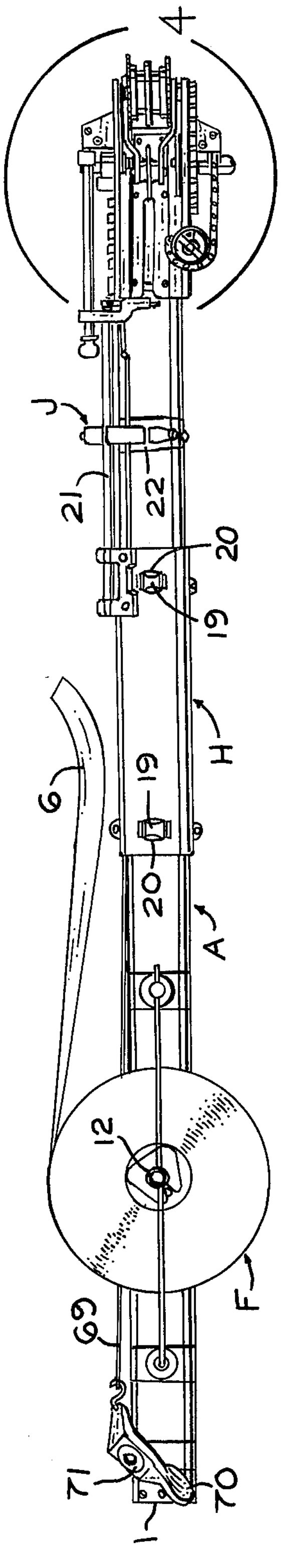
FIG. 2 is a bottom plan view of FIG. 1.

The body A of the tool is a hollow cylinder and is adapted to hold a supply of mastic, see FIGS. 1 and 2. The rear end of the body is closed by a removable end cap 1. The front end of the body A is shown in section in FIG. 5 and it is closed by a removable front cap B. This cap B has an opening for receiving a mastic filler tube C which in turn carries a spring biased filler valve 2. When mastic is forced into the tube C under pressure, it will open the valve 2 and enter the interior of the hollow body. As soon as the filling operation is complete, which will be explained more in detail hereinafter, the valve 2 will close and prevent any reverse flow of the mastic in the filler tube C.

Figure 5:
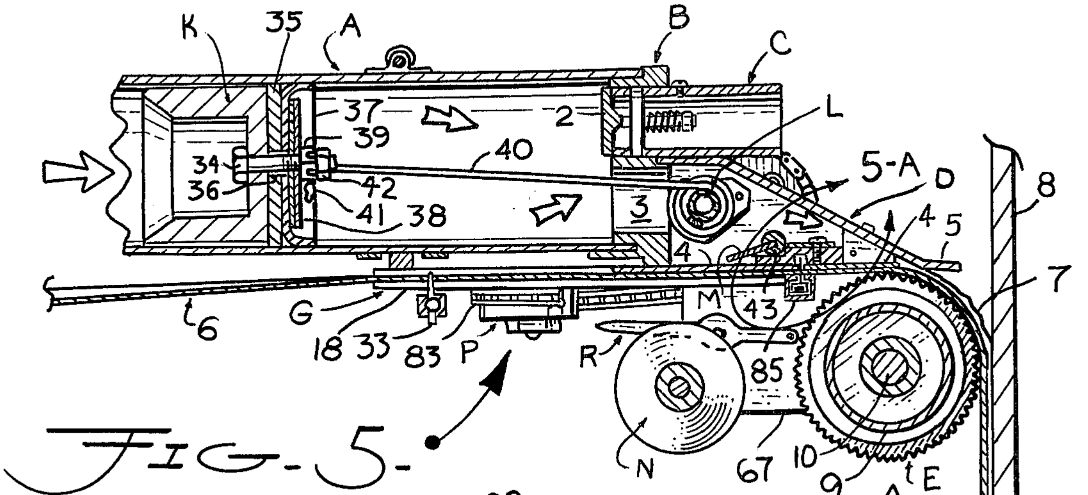
FIG. 5 is a longitudinal section taken along the line 5—5 of FIG. 4 and illustrates the mastic ejecting nozzle in its relation to the tape for applying a layer of mastic to the tape as the tape contacts the peripheries of the tape applying wheels.

The front end cap B for the hollow body A has another opening 3 therein, see FIG. 5, through which mastic can be forced into a mastic ejecting nozzle indicated generally at D, in FIGS. 1 and 5. The nozzle D has a bottom plate 4 and a top plate 5 that is inclined toward the bottom plate and is spaced a slight distance from the outer edge of the bottom plate to form a slot through which the mastic is forced in a thin layer in a manner later described. The side walls of the nozzle D determine the width of the mastic layer and this is the same as the width of the tape 6 onto which the layer of mastic is applied. To accomplish this the inclined top plate 5 extends beyond the outer end of the bottom plate 4 and is formed into an upwardly curved lip, the under surface of which will apply the mastic layer 7 to the tape 6 just prior to the tape and mastic being applied to a wall surface 8.

Before describing the mechanism for forcing mastic from the hollow body A into the nozzle D, it is best to set forth the tape feeding and guiding wheels E whose toothed peripheries receive the tape 6 at a position to hold the moving tape in sliding contact with the undersurface of the bottom plate 4 of the nozzle D so that the upper surface of the tape will receive the web or layer of mastic as it is exuded from the outlet slot of the nozzle, see FIG. 5. The outer curved lip of the inclined top plate 5 of the nozzle applies the mastic layer to the tape and immediately the wheels E apply the mastic and tape to the wall surface 8. The two wheels E, are mounted at the ends of a hub 9 which in turn is mounted on a shaft 10 that in turn rotates in bearings carried by the extended side walls 47 and 48 of the nozzle D, see FIGS. 3, 4, 5 and 6.

TAPE FEEDING MEANS

Referring again to FIGS. 1 and 2, I show a shaft 12 for rotatably supporting a roll of tape F from which the tape 6 is fed. The shaft is secured to the body A by a bracket 13. Another bracket 14 carries a sleeve 15 and an L-shaped wire 16 has one leg received in the end of the sleeve and the other leg extends through an opening in the shaft 12 and has its end extending through another opening in a third bracket 17, supported by the body A. In this way the roll F, of tape is rotatably and removably supported by the body A.

Figure 4:
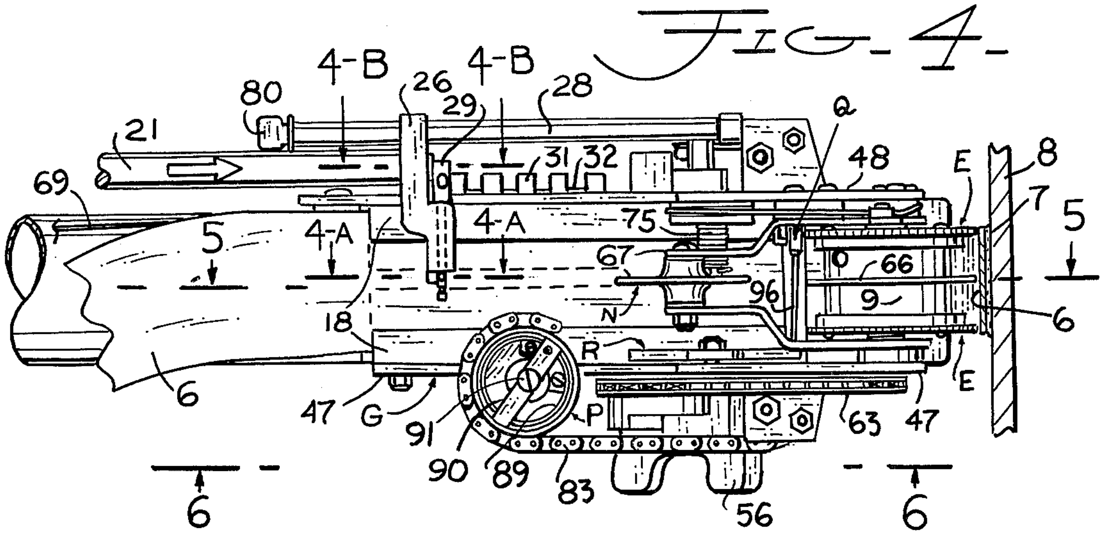
FIG. 4 is an enlarged view of the circled portion 4 in FIG. 2.
Figure 4:
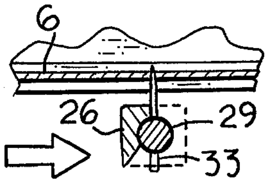
Figure 4:
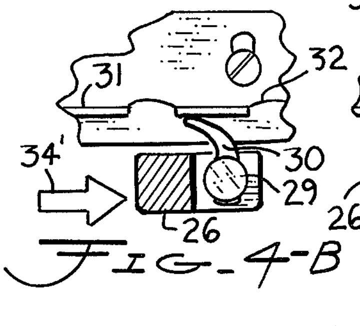
Figure 4:
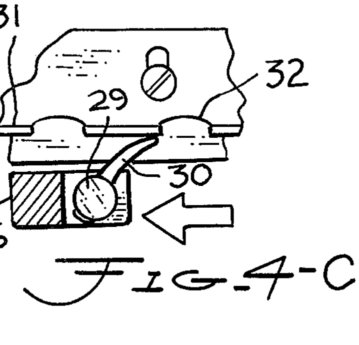

The tape 6 is fed from the roll F to a tape guide and feeding mechanism indicated generally at G, and disposed adjacent to the nozzle D, see FIGS. 4 and 5. The tape guide has inwardly facing guide channels 18 that lie in a plane that parallels and directly underlies the bottom plate 4 of the nozzle D. These guide channels slidably receive the edges of the tape 6 and cause the tape to be fed past the exit slot of the nozzle so that the layer of mastic 7 will be deposited onto the tape as the latter is engaged by the toothed peripheries of the tape feeding wheels E.

Figure 7:
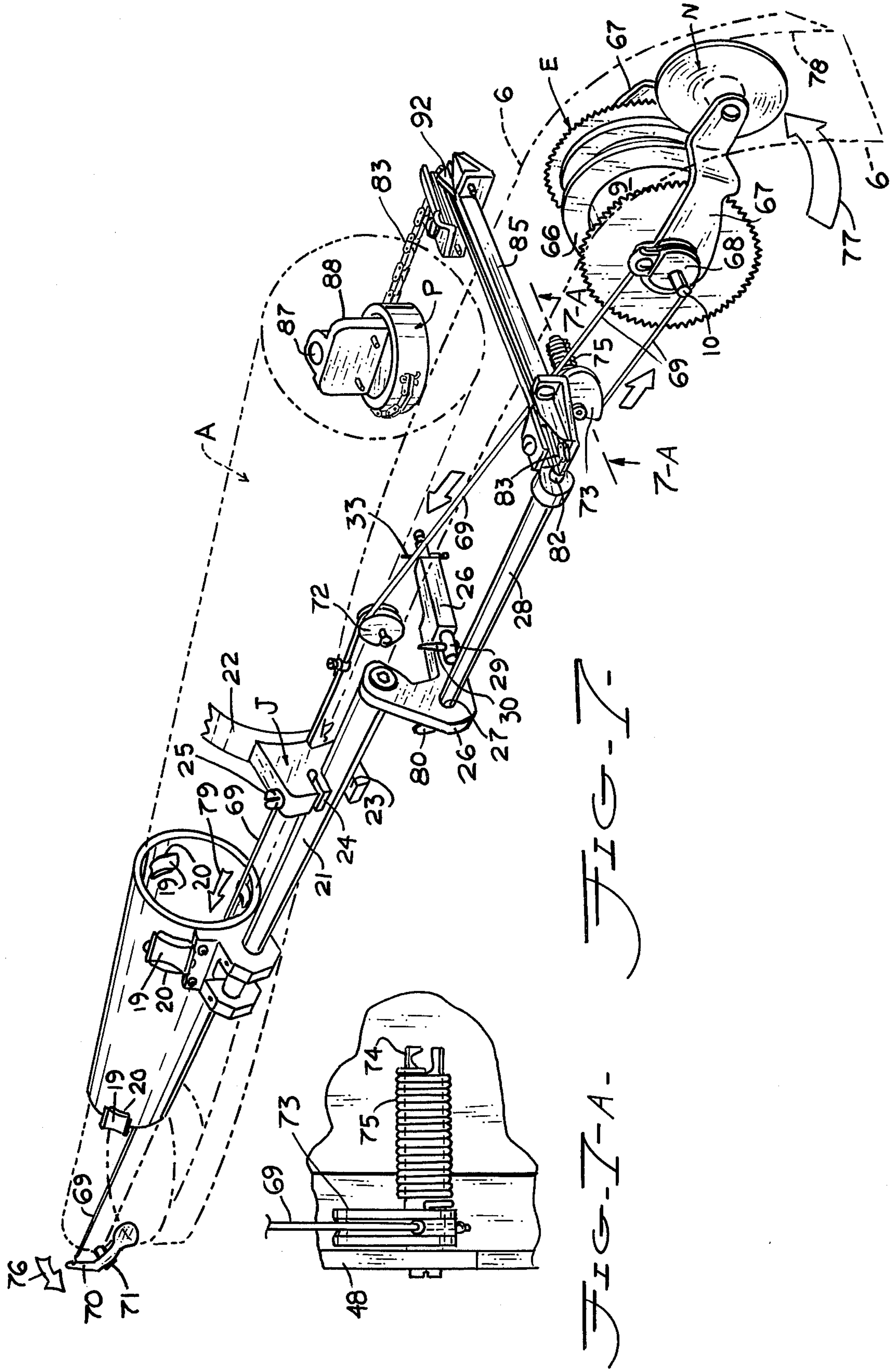
FIG. 7 is a perspective view of the operative mechanism for actuating the tape feeder and tape cutter and for actuating the tape creaser that will form a median crease along the tape as it is forced into the inner corner of a room.

I provide manually controlled positive feeding means for the tape for initially feeding the tape to the nozzle D, and to the tape applying wheels E. In FIGS. 1, 2 and 7, I show a slidable tape feeding and tape cutting sleeve H, and I will first describe its function for initially feeding the tape 6 along the tape guide G, and toward the wheels E. The slidable sleeve H, has rollers 19 that extend through slots 20 in the sleeve for permitting the rollers to ride on the cylindrical body A, and to space the inner surface of the sleeve a slight distance away from the adjacent surface of the body A. The diameter of the sleeve H, is larger than the diameter of the body A. The right hand end of the sleeve H, in FIGS. 1, 2 and 7 carries a forwardly extending rod 21 and this rod slides in an adjustable guide J, see especially FIG. 7 which in turn is secured to the body A by a band 22. The guide J, is preferably made of nylon and it has a recess 23 for slidably receiving the rod 21, and an integral tongue 24 forming one side of the recess. A set screw 25 is threaded into a threaded bore in the guide J, and bears against the tongue 24 for forcing it against the rod 21 for exerting the desired friction against the rod.

The front end of the rod 21 has an arm 26 of the shape shown in the perspective view of FIG. 7. This arm has an opening 27 slidably receiving another rod 28 that is used for actuating the tape cutting mechanism, which will be described later. The arm 26 has a lateral extension that underlies the tape guide, see also FIG. 4, and this extension rockably carries a short shaft 29. The shaft 29 has a rubber tip 30 that rides along a track 31 with a plurality of notches 32 spaced along the track as shown in FIGS. 3, 4, 4B and 4C. The other end of the rockable shaft 29 carries a tape engaging pin 33, and this pin travels in the space between the two tape guide channels when the operator moves the sleeve H forwardly on the body A and causes the rod 21, arm 26, and shaft 29 to move forwardly. FIG. 4B shows by the arrow 34' the forward movement of the arm 26 with respect to the stationary track 31 and when the rubber tip 30 rides along on the underside of the track, it will be flexed as shown and will rock the shaft 29 on its longitudinal axis to swing the pin 33 into positive engagement with the tape 6, see FIG. 4A. As soon as the pin 33 penetrates the tape, the tape will be moved along the guide G toward the nozzle D, as the sleeve H is moved.

FIG. 4C illustrates the return movement of the arm 26 when the sleeve H, is returned to its normal position by the operator. In this view the rubber tip 30 has been swung in the opposite direction by riding along and in contact with the underside of the track 31. The tip 30 will rock the shaft 29 and swing the pin 33 out of engagement with the tape 6 and keep it out of engagement during the return movement of the sleeve H. Therefore, there will be no tendency for the pin 33 to move the tape 6 in a reverse direction during the return movement of the sleeve H.

The purpose of the notches 32 in the track 31 is to permit the operator to take shorter strokes with the forward movement of the sleeve H is he wishes to advance the tape 6 further toward the wheels E if the first forward movement was insufficient to accomplish this. He can move the sleeve H only a partial distance on its return movement and then start moving the sleeve forwardly again on the body A. When this is done the rubber tip 30 will enter one of the notches 32 and will rock the shaft 29 to again engage positively with the tape 6 and advance it toward the wheels E. The operator must initially move the free end of the tape into the guide G into a position where it will be engaged by the pin 33 when the sleeve H is moved forwardly on the body A. From this time on, the moving of the tape in the guide is accomplished by manipulating the sleeve on the body until the tape reaches the tape feeding wheels E. During the actual moving of the tool over a wall surface to apply the tape and mastic thereto, the wheels are the driving force for the tape as the wheels are rotated by contacting with the wall surface. I will now describe the mechanism for applying a layer of mastic to the tape just prior to the tape being applied to the wall surface.

MECHANISM FOR APPLYING MASTIC TO THE TAPE

A piston K, is slidably mounted in the cylindrical body A, see FIG. 5, and a bolt 34 is centrally mounted at the closed end of the piston. A plastic disc 35 has a central opening 36 larger in diameter than that of the bolt shank so that the disc can shift laterally with respect to the bolt and piston. A cup washer 37 has a center opening larger in diameter than the bolt shank so that there can be a relative transverse movement of the washer with respect to the piston. A pair of metal discs 38 are mounted on the bolt 34 and a castle nut 39 is threaded onto the bolt 34 and is spaced a sufficient distance from the closed end of the piston to permit lateral movement of the disc 35 and cup washer 37 with respect to the piston K.

The purpose for this arrangement of the free lateral shifting of the cup washer 37 with respect to the piston is to accommodate the change of the angle of pull of a cable 40 on the piston as the piston is moved from the cap 1, at the rear end of the body A toward the nozzle D for forcing mastic out through the nozzle and onto the tape 6. One end of the cable 40 is received in a longitudinal groove in the shank of the bolt 34 and then the end extends through one of the recesses in the castle nut 39 and has a blob of solder 41 applied to the cable and large enough to prevent the cable from being pulled free of the castle nut recess. A lock nut 42, see FIG. 5, is also threaded onto the bolt shank and clamps against the castle nut 39 for securing it in place and also for locking the cable end to the piston K.

Figure 10:
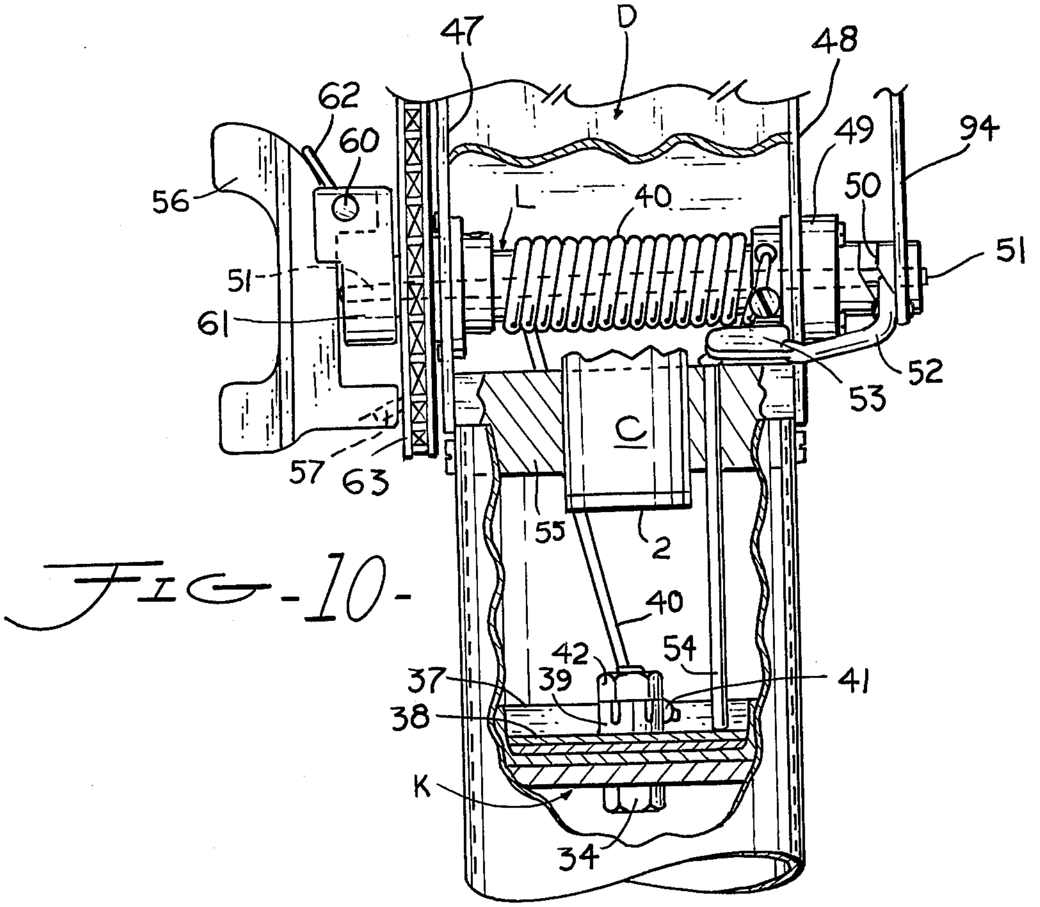
FIG. 10 is an enlarged section taken along the line 10—10 of FIG. 3 and illustrates the automatic release of the cable from moving the piston when the piston reaches the end of its mastic ejecting stroke in the hollow body.
Figure 11:
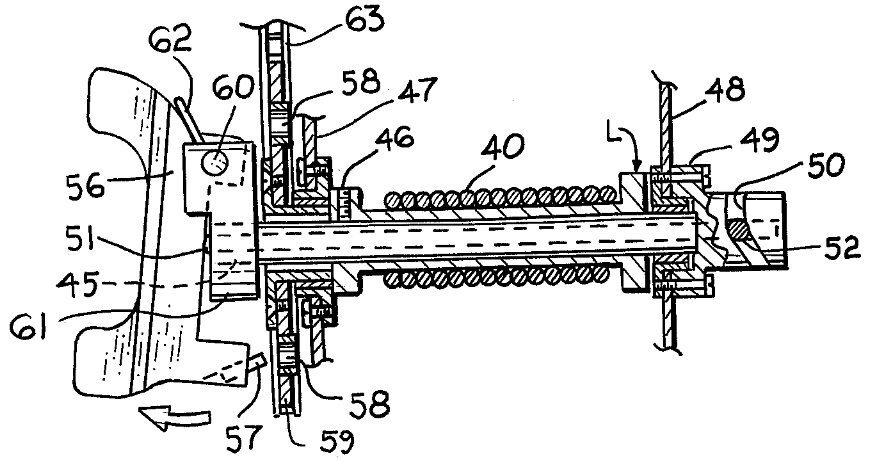
FIG. 11 shows the mechanism associated with the cable drum shaft partly in section and elevation to illustrate the actuation of the cable release mechanism to free the cable drum from the chain and sprocket connection from the tape applying wheels so as to permit the wheels to rotate without rotating the cable drum shaft.
Figure 12:
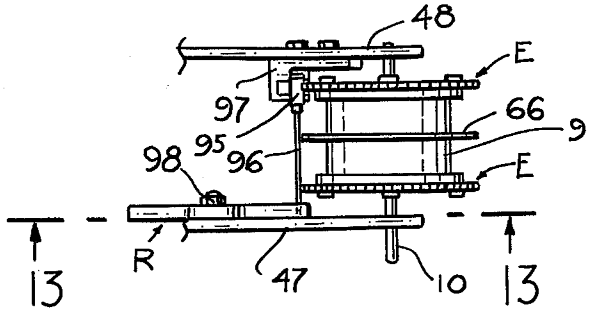
FIG. 12 is a bottom plan view of only a portion of the tool shown in FIG. 4 and only illustrates the mechanism for applying a desired braking force on the periphery of one of the tape applying wheels.

Still referring to FIG. 5, and also to FIGS. 10 and 11, it will be seen that the other end of the cable 40 is secured to and wrapped around a hollow drum L. As the piston K nears the nozzle D, it will be seen especially from FIG. 10, how the short remaining portion of cable between the drum and piston, is pulling at an angle to the axis of the piston. This angular pull of the cable on the piston is not applied to the cup washer 37 because it is free to adjust laterally with respect to the piston so as to always move along the axis of the body A. There is no lateral pull on the cup washer and therefore there is no undue friction of one portion of the cup washer against the cylindrical wall of the body A. Hereinafter I will describe the particular mounting and associate mechanism for rotatably supporting the hollow drum L that will automatically free the piston from being pulled by the cable 40 when the piston reaches the end of its stroke for feeding mastic through the nozzle. Suffice it to say, at this juncture that the hollow drum L, is freed from the mechanism that rotates it during the feeding of mastic through the nozzle and remains in this condition during the subsequent filling of the cylinder with mastic to permit the piston to be pushed to the rear end of the body A at which time the operator again connects the hollow drum to the mastic feeding mechanism for forcing mastic through the nozzle and onto the tape.

Figure 3:
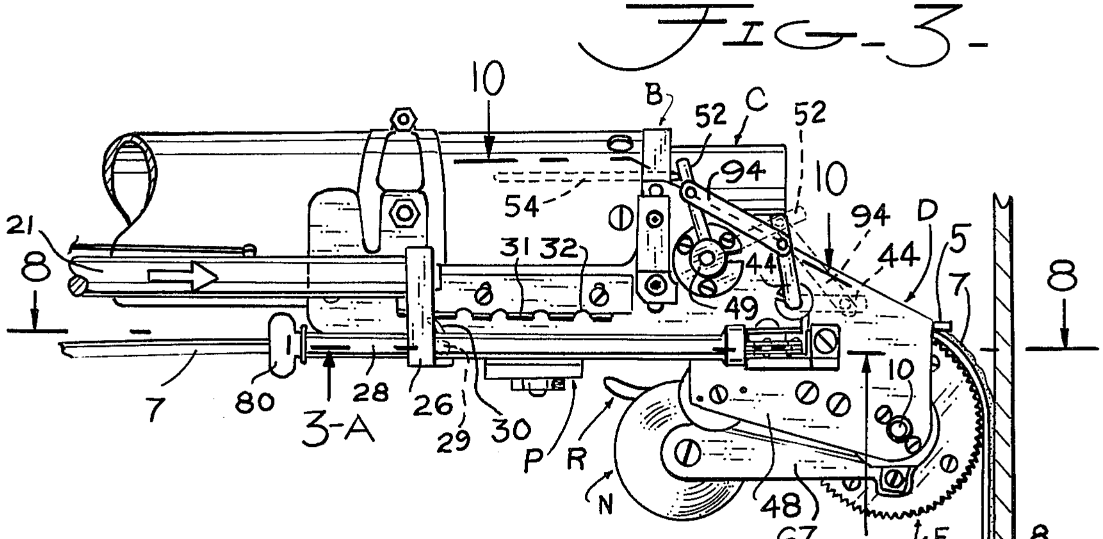
FIG. 3 is an enlarged view of the circled portion 3 in FIG. 1.
Figure 3:
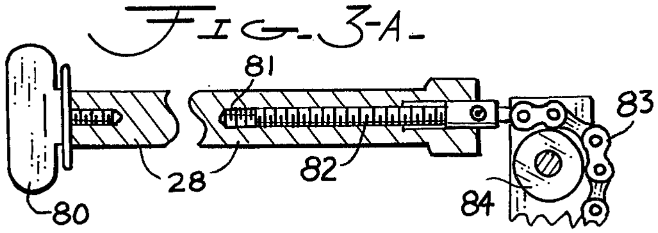

In FIGS. 5 and 5A I show a swingable gate valve M that can be manually closed for preventing mastic from being fed through the nozzle D during the filling of the body A with a new supply of mastic. The gate valve M projects radially from a shaft 43 which in turn extends across the throat of the nozzle D. The gate valve is shown in open position so that the mastic is free to be forced through the throat and out from the nozzle to be applied as a thin layer 7 onto the tape 6. The ends of the shaft 43 are journalled in the side walls of the nozzle and FIG. 3 shows a handle 44 for rocking the shaft 43 for swinging the gate valve M from open to closed position and vice versa. The handle 44 is shown in FIG. 3 in full lines for open valve position and in dot-dash line position for a closed valve. The gate valve M is closed during the filling of the hollow body A with mastic. I will explain later the mechanical connection between the handle 44 and the hollow drum L which will free the drum from the mastic feeding mechanism during the time the hollow body is being filled with mastic. The new supply of mastic is forced through the filler tube C, see FIGS. 5 and 10, and will open the spring biased check valve 2 during the feeding operation. When the piston K reaches the rear end of the body A, the check valve 2 will close and the operator actuates the handle 44 to swing it and the gate valve M, into open position.

I will now describe the mechanism which operatively connects the drive wheels E with the hollow drum L, so that as the wheels are rotated for applying the tape 6 to a wall board surface 8, the piston K will be moved for applying a layer of mastic 7 to the tape immediately prior to the tape being applied to the surface 8. In FIG. 11 I show the hollow drum L keyed to a hollow shaft 45 by a set screw 46. The hollow shaft 45 rotates in bearings carried by the side walls 47 and 48 of the nozzle D. At the right hand end of the hollow shaft 45, I mount a stationary member 49 having a cam groove 50 therein. This cam groove extends through an arc of about 180°.

A rod 51 slides longitudinally within the axial bore of the hollow shaft 45 and an L-shaped handle 52, see FIG. 10, has one leg connected to the rod 51 and slidably received in the cam groove 50 and has its other leg provided with an integral plate 53 that lies in the path of a push rod 54 slidably carried by a cross partition 55 in the body A. When the piston K nears the partition 55, it will contact the inner end of the rod 54 and push it outwardly. This will cause the other end of the rod to swing the plate 53 and handle 52 for causing the portion of the handle in the cam groove 50 in the stationary member 49 to travel along the cam groove and move the rod 51 to the left in FIG. 11. This will cause the left hand end of the rod 51 to swing a dog 56 outwardly to free its detent 57 from an opening 58 in a sprocket 59, see also FIG. 6. The dog 56 is pivoted at 60 to a member 61 which in turn is keyed to the hollow shaft 45. The dog 56 is spring biased and the spring 62, tends to swing the dog from released position, shown in FIG. 11, into operative position, shown in FIG. 10 where the dog detent 57 enters one of a plurality of openings 58 in the sprocket 59 and operatively connects the sprocket to the hollow drum L through the medium of the hollow shaft 45 that is connected both to the member 61 and the drum.

Figure 6:
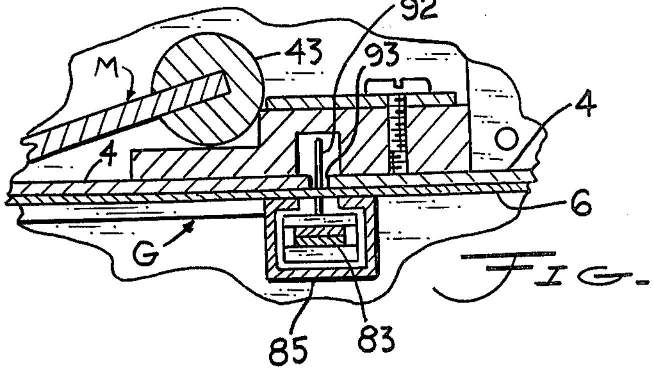
FIG. 6 is a side elevation of a portion of the tool shown in FIG. 4 when looking in the direction of the arrows 6—6 of that Figure.
Figure 6:
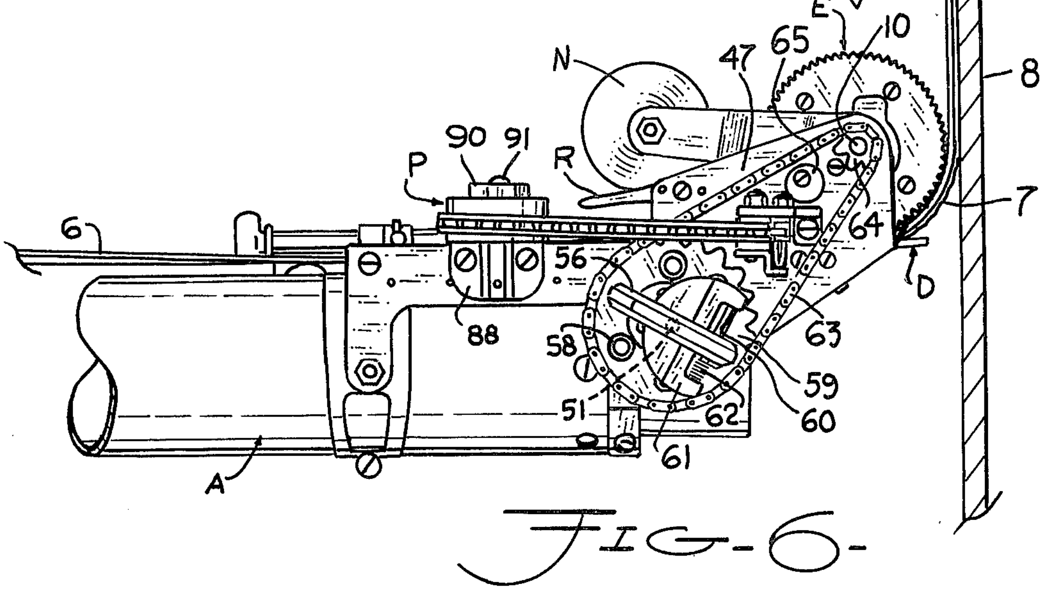

FIG. 6 shows a side elevation of the sprocket 59 and shows the dog 56 pivoted at 60 to the member 61. The end of the slidable rod 51 pressing against the underside of the dog 56 is also indicated. A sprocket chain 63 connects the large diameter sprocket 59 to a small diameter sprocket 64, the latter being keyed to the shaft 10 that in turn supports the drum 9 and the drive wheels E. The ratio between the small sprocket 64 and the large sprocket 59 is so designed that as the drive wheels E move the tape 6 past the nozzle D, the cable 40, being wound upon the hollow drum L will move the piston K, at the right speed to force a layer of mastic 7 onto the tape. An eccentric idler 65 on the side wall 47 of the nozzle D, can be adjusted to take up any slack in the sprocket chain 63.

I have already described how the tape 6 is initially fed from the roll of tape F to the drive wheels E, and I have just described how the drive wheels E, are operatively connected to the piston K for moving it toward the nozzle D, in the body A for feeding the proper amount of mastic and applying it as a thin layer 7 on the tape 6. The operator now moves the tool over a wall surface 8 for covering a wall board joint or for any other purpose and the drive wheels E will not only feed the tape and mastic to the wall surface, but they will also press the tape and mastic against the surface to make it adhere and be pressed into proper position. It will be seen from FIG. 4 that the drum 9 which supports the drive wheels E also supports a middle disc 66 that aids in pressing the tape 6 and mastic 7 against the wall surface 8.

TAPE CREASING DISC

In FIG. 7, I show in a schematic perspective view, a tape creasing disc N mounted on a pair of arms 67 that are swingable about the shaft 10 which also rotatably supports the drum 9 and drive wheels E. A pulley 68 is clamped to one of the arms 67 so that when the pulley is rotated on the shaft 10, it will swing the adjacent arm 67 therewith in order to swing the tape creasing disc about the axis of the shaft 10 as a center. A cable 69 for rotating the pulley 68 for swinging the arms 67 and disc N, has one end connected to a lever 70, see also FIGS. 1 and 2, which is pivotally connected to the body A, at 71. The cable 69 extends the entire length of the body A, and is passed under the slidable sleeve H because the rollers 19 space the sleeve a slight distance from the body A. FIG. 7 shows the cable 69 passing over an idler pulley 72 and then the cable is passed around the pulley 68 and has its other end connected to a half pulley 73, rotatably mounted on a stub shaft 74 that extends inwardly from the side wall 48, see also FIG. 7A. A torsional spring 75 is mounted on the stub shaft 74 and has one end secured to the shaft and its other end secured to the half pulley 73. The tendency for the torsional spring 75 is to rotate the pulley 73 for winding the cable 69 thereon, this cable movement acting on the pulley 68 for rotating it for swinging the arms 67 and tape creaser N from the operative position shown in FIG. 7, into inoperative position shown in FIGS. 1 and 3.

When the operator is applying the tape and mastic to an inner room corner, he swings the lever 70 in the direction of the arrow 76 in FIG. 7, and this will actuate the cable 69 for rotating the pulley 68 and swinging the arms 67 for moving the tape creasing disc N against the center of the tape as shown by the arrow 77. Then as the operator moves the tool along the inner room corner the disc N will form a median crease 78 in the tape and force this portion of the tape into the corner while the spaced spaced apart pair of drive wheels E will engage with the tape near the two edges thereof and press the tape against the adjacent wall surfaces. As soon as the operator frees the lever 70, the torsional spring 75 will swing the tape creaser N back into inoperative position.

TAPE CUTTING MECHANISM

After the operator finishes applying tape and mastic to a wall board joint or the like, his next act is to sever the tape 6. He accomplishes this by moving the slidable sleeve H, on the body A, in a reverse direction from its neutral position on the body in order to actuate the tape cutting mechanism. I will now describe this mechanism. FIG. 7 shows the slidable sleeve H, on the body A, and the arrow 79 on the inside of the sleeve indicating the necessary movement of the sleeve for it to actuate the tape cutting mechanism. It might be wise to mention at this point that the operator when using the tool grasps the slidable sleeve with one hand and uses his other hand for gripping the body A of the tool. I have already described how the slidable sleeve H, moves the rod 21 forwardly when the operator wishes to move the arm 26 for feeding the tape 6 toward the drive wheels E. The arm 26 slides on the rod 28 during this movement.

Figure 8:
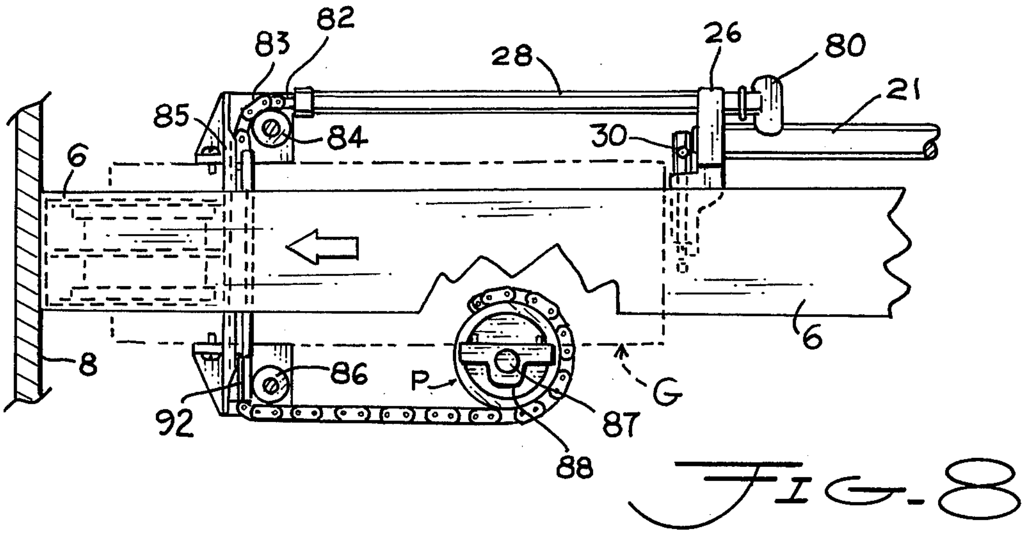
FIG. 8 is a detail of the tape cutting mechanism with the cutter in inoperative or neutral position.
Figure 9:
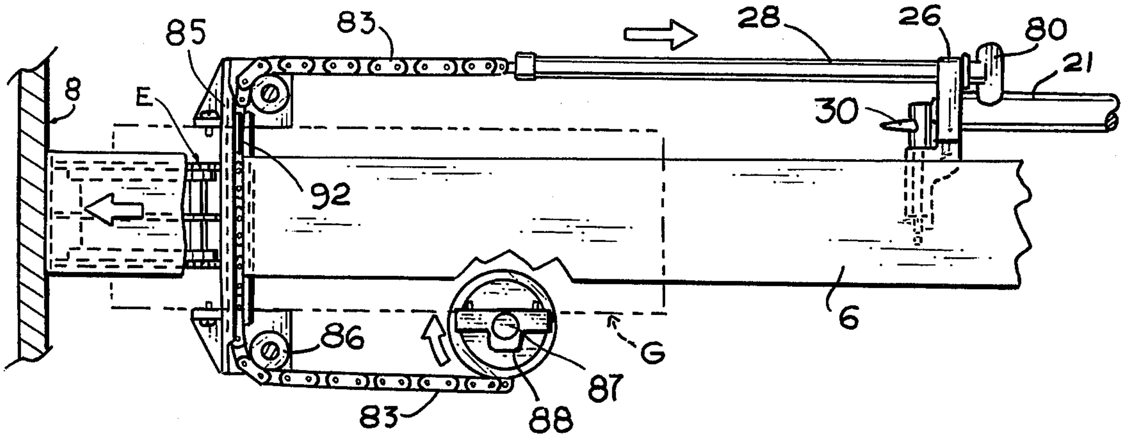
FIG. 9 is a view similar to FIG. 8, but shows the tape cutter at the end of its tape cutting stroke and before being returned to neutral position.

However, when the sleeve H, is moved toward the rear of the body A, in order to actuate the tape cutting mechanism, it will move the rod 21 rearwardly, see FIG. 7, and the rod through its arm 26 will move the rod 28 rearwardly. The arm 26 when in starting position, is in contact with the winged cap screw 80, mounted at the rear end of the rod 28, see FIGS. 3A, 8 and 9. The forward end of the rod 28 has an axial threaded bore 81 that receives a threaded shank 82. The front end of the threaded shank 82 is connected to a chain 83. The schematic view of FIG. 7 and the plan views of FIGS. 8 and 9 show the chain 83 being passed around an idler pulley 84, rotatably mounted at one side of the tool body A. Then the chain is slidably received in a transversely extending channel 85 and is passed around a second idler pulley 86, rotatably mounted on the other side of the body A. From here the end of the chain is connected to a spring biased drum P, see FIGS. 6 and 7.

The spring biased drum P, is rotatably mounted on a stationary shaft 87 that is supported by a bracket 88, and secured to the side wall 47. A torsional spring 89 is mounted inside the durm P, and has one end connected to the drum while its other end is connected to an adjustable bar 90, which extends diametrically across the inner cylindrical surface of the drum and has its center secured to the end of the stationary shaft 87 by a screw 91. The torsional spring 89 can be adjusted by loosening the screw 91 and rotating the bar 90 about the screw shank to increase or decrease the force of the spring, after which the screw is tightened to prevent the bar 90 from turning. The torsional spring is hidden from view by being mounted within the drum.

A tape cutting knife 92, see FIGS. 5A and 7, is mounted in the chain 83 at a position in the chain that when the rod 28 is in normal position, the knife will be disposed adjacent to the pulley 84, also see FIG. 8. Now when the operator moves the sleeve H, rearwardly to pull both the rods 21 and 28, rearwardly, the rod 28 will pull on the chain 83 and the chain will move the knife 92, laterally along the channel 85 for causing the knife to sever the tape, see FIG. 9. The enlarged sectional view of FIG. 5A, shows the knife riding in a slot 93 in the bottom plate 4. This arrangement provides a positive means for cutting the tape 6 because the tape underlies the bottom plate 4 and is held against the plate by the tape guide G. The knife 92 extends above the bottom plate and therefore as the knife travels along the slot 93 the tape is held between the bottom plate 4 and the tape guide G, and must be cut.

During the tape cutting movement, the chain 83 will partially unwind from the drum P, and will rotate the drum to increase the force of the torsional spring 89. As soon, therefore, as the operator returns the sleeve forwardly on the body A to its neutral position, the torsional spring 89 will act on the drum P to rewind the chain 83 thereon and return the knife 92 to its starting position and the chain will also return the two rods 28 and 21 to their starting position.

The threaded rod 82 in the threaded bore 81 in the rod 28 provides novel adjustable means for taking up any slack in the chain 83 that might result from wear. The winged cap screw 80 can be manually rotated for rotating the rod 28 with respect to the threaded shank 82. This will cause the threaded rod 82 to move longitudinally with respect to the rod 28 and to tighten the chain 83. The opposite would be true if the winged cap screw 80 rotates the rod 28 in the opposite direction.

I show in FIG. 3 the handle 44 for rocking the shaft 43, see FIG. 5, that in turn operates the swingable gate M for closing or opening the nozzle D. I provide a link 94 for interconnecting the hollow drum L from the sprocket 59 so that the hollow drum can rotate independently of the sprocket. When the operator wishes to fill the interior of the body A with a fresh supply of mastic, he swings the handle 44 from the full to the dot-dash line position in FIG. 3 to close the gate valve M, and stop any mastic from escaping through the nozzle D. This same swinging movement of the handle 44 will cause the link 94 to swing the L-shaped handle 52 for moving the rod 51 and swinging the dog 56 to disengage its detent 57 from operative engagement with the sprocket 59, as has already been described, see FIG. 11.

The hollow drum L, is now freed from the sprocket 59 and the piston K, is free to move toward the rear end of the body A, as the incoming mastic through the filler tube C, moves the piston, see FIG. 5. The cable 14 will unroll from the freed cable drum L, as the piston is moved and pulls the cable therewith. The sprocket 59 is not rotated during this mastic filling operation. When the filling operation is completed, the operator swings the gate valve handle 44 from the closed dot-dash line position, shown in FIG. 3, back into open position, shown by the full lines, and this will move the link 94 for swinging the L-shaped handle 52 from the dot-dash to the full line position. The rod 51 in FIG. 11, will be retracted and permit the torsional spring 62 to yieldingly hole the detent 57 of the dog 56 against the adjacent face of the sprocket 59. As soon as the drive wheels E, are rotated, they will rotate the large sprocket 59 through the medium of the small sprocket 64 and the sprocket chain 63 until the next opening 58 in the large sprocket 59 comes into registration with the dog detent 57, at which moment the detent will enter the opening and operatively connect the dog 56 to the large sprocket 59. The hollow drum L, is now operatively connected to the drive wheels E, and as the operator moves the tool over a wall area, the wheels E will be rotated and will rotate the drum L to wind the cable 40 thereon for pulling the piston K along the body A and force the right amount of mastic from the nozzle D to be applied to the tape 6 just before the tape and mastic layer 7 are applied to the wall surface for covering a wall board joint or for any other purpose.

ADJUSTABLE BRAKING FORCE APPLIED TO DRIVE WHEELS

Figure 13:
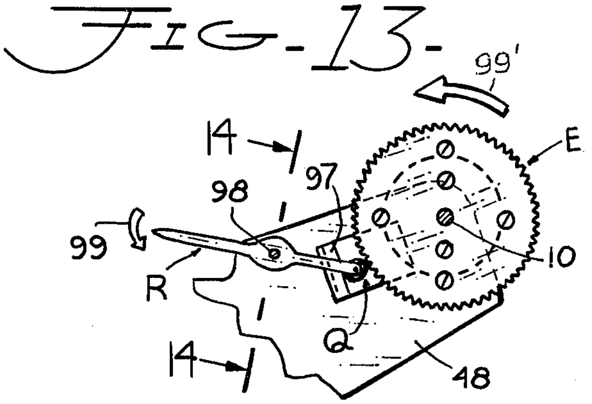
FIG. 13 is a section taken along the line 13—13 of FIG. 12 and diagrammatically shows a carbide roller being movable between a cam and the wheel periphery for applying a braking force against the wheel.
Figure 14:
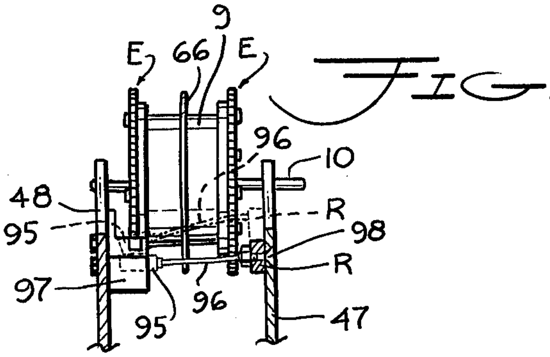
FIG. 14 is a section taken along the line 14—14 of FIG. 13 and shows how the carbide roller is mounted on a spring shaft which can be flexed by shifting a lever for causing the shaft to yieldingly force the roller between the cam and wheel periphery for adjusting the desired braking force applied against the wheel rim.
Figure 15:
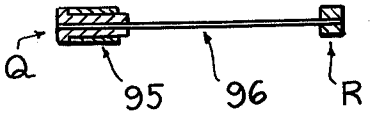
FIG. 15 is an enlarged sectional view of the braking roller and shows the carbide roller as having a nylon interior that can rotate on one end of the spring shaft. This figure further shows the other end of the spring shaft being anchored in a lever that can be mutually swung for altering the tension applied against the tape and mastic feeding wheels.

In FIGS. 12 to 15 inclusive, I show the adjustable braking mechanism as comprising a nylon roller Q, as having a rim of carbide 95 and being rotatably mounted on one end of a spring wire which functions as a flexible shaft 96, see especially FIG. 15. The other end of the shaft 96 is rigidly mounted in one end of a lever R. The braking roller Q is disposed near the side wall 48 of the tool and rides against an inclined cam 97, attached to the wall, see FIGS. 12 and 13. The cam 97 has an insert of carbide and the carbide rim 95 of the roller Q rides along this surface. The lever R, is pivoted to the wall 47 at 98 and when the lever is manually swung in the direction of the arrow 99, shown in FIG. 13, it will swing the opposite end of the lever for moving the spring shaft 96 and the roller Q, into the narrowing wedge-shaped recess formed between the inclined cam 97 and the adjacent toothed edge of one of the drive wheels E. There is a friction contact between the lever and the wall 47 which tends to hole the lever in the position into which it has been swung. FIG. 14 illustrates two positions of the lever R, and illustrates that when the lever is swung into the dot-dash line position, the spring shaft 96 will be flexed as the shaft moves the roller Q farther into the narrowing wedge-shaped recess formed between the inclined cam 97 and the toothed rim of the adjacent drive wheel E. Therefore the roller Q will be yieldingly moved into this wedge-shaped recess to apply a braking force on the wheel.

The structure I have just described performs a vital function in the operation of the tool. When the operator is applying tape and mastic to a vertical wall board joint and is moving the tool upwardly along the joint to its top, at the moment he severs the tape, there is nothing to support the piston and the weight of the mastic remaining in the tool body A when the operator removes the drive wheels E from the wall. While the tool is applying the tape and mastic to the wall, the drive wheels E are rotating in the direction of the arrow 99' in FIG. 13 and the cable 40 is pulling the piston K along the body A to expel the mastic from the nozzle D. As soon as the operation is completed and the body A is still being held in an approximately vertical position with the nozzle at the top, a movement of the body A away from the wall and a freeing of the drive wheels E from the wall will permit the piston and the weight of the mastic in the body A to move the piston downwardly in the body by gravity. This will reverse the rotation of the cable drum L as the cable 40 unwinds therefrom and this will also reverse the rotation of the drive wheels E.

It will be seen from FIG. 13 that the braking roller Q is already positioned in the wedge-shaped space between the cam 97 and the adjacent toothed periphery of the drive wheel E and is yieldingly held in this position by the flexed spring shaft 96. A reversal of the rotation of the drive wheel rotation from that shown by the arrow 99' because the drive wheels E, are now free to rotate, will completely wedge the roller Q into the narrower portion of the wedge-shaped recess formed by the cam 97 and the periphery of the drive wheel E, and will bring the wheels E to an immediate stop and will stop the piston K from moving in the body A. No air pockets can therefore form in the body between the piston and the nozzle. Furthermore, the operator can apply the desired amount of braking force on the drive wheels E even when applying the tape and mastic onto the wall surface. Also any wear on the toothed rims of the wheels E can be compensated for by the operator adjusting the lever R, into a new position for increasing the flexing of the spring shaft 96.

OPERATION

I have described most of the operation of the tool in my general description of the entire device. The tool body A can be filled with mastic by first actuating the handle 44 for closing the gate valve M which closes the nozzle outlet. At the same time the link 94 will swing the L-shaped handle 52 to free the sprocket 59 from the dog 56 and thereby free the cable drum L from the drive wheels E. The mastic as it enters the filler tube C will open the check valve 2 and flow into the body A and move the piston K to the rear end of the body A. When this is completed, the check valve 2 will close and the operator actuates the handle 44 to open the gate valve M, and the link 94 will swing the handle 52 to connect the cable drum L to the drive wheels E. The operator can rotate the wheels to move the piston K to force out any air pockets in the mastic and will stop rotating the wheels when the mastic is ready to be forced out from the nozzle.

Next, the operator feeds the tape 6 into the tape guide G, and then moves the sleeve H forwardly on the body A for causing the pin 33 to penetrate the tape, see FIG. 4A for moving the tape onto the rims of the drive wheels E. If a reciprocation of the sleeve H, on the body A to accomplish this is necessary, the operator can do this and on the return movement of the pin 33, it will be pulled free from the tape and will not drag against it on the return stroke. There will be no tendency for the tape 6 to be pulled in a rearward direction in the tape guide.

The tool is now ready for use and the operator applies the tape and the layer of mastic to a wall surface 8 to cover a wallboard joint or the like and moves the wheels E along the wall and causes them to straddle the joint, not shown. The drive wheels E will be rotated as they travel along the wall and they will apply the tape and mastic to the wall surface. The tape will be fed by the wheels E and the piston K will force mastic onto the tape in proper order.

At the end of the operation, the operator moves the sleeve H rearwardly on the body A and this will cause the knife 92 to cut the tape 6. The knife travels in the transverse slot 93 and the tape must be positively cut. A torsional spring 89 acts to return the knife to its starting position after the cutting operation. The torsional spring takes up little space and is hidden in the drum P. Also the tension of the torsional spring can be adjusted.

I have already explained how an adjustable braking force can be applied to the drive wheels E, and how the wheels are prevented from a reverse rotation when the body A, while being held in about a vertical position is removed from the wall surface so that the drive wheels no longer contact therewith. The tape creasing disc N can be brought into operative position any time the operator wishes to apply the tape and mastic layer to the inner corner of a room. This is accomplished by swinging the lever 70. As soon as the operation is completed the lever 70 is manually released and the torsional spring 75 will swing the disc into an inoperative position.

When the piston K nears the partition 55 at the forward end of the body A, it will strike the inner end of the rod 54 that is slidably carried by the partition, see FIG. 10. As the rod is moved, its outer end will move the plate 53, affixed to the L-shaped handle 52, and swing the handle. The handle swings in the cam groove 50 in the member 49 and will shift rod 51 longitudinally along the bore of the hollow shaft 45. This will swing the dog 56 about its pivot 60 and free the detent 57 from its opening 58 in the sprocket 59. In this manner the drive wheels E, are disconnected from the cable drum L, and the cable 40 will cease moving the piston K. The swinging of the handle 52 will swing the handle 44 to close the gate valve M for the nozzle D because the two handles are interconnected by the link 94. The tool is now ready for another filling of the body A with mastic because the gate valve M, is closed and the piston K, is free to be moved by the incoming mastic without causing the drive wheels E to rotate.

I claim:

1. A self-contained dry wall taper comprising:

(a) a hollow elongated body containing mastic and having a nozzle at its foward end for delivering a layer of mastic onto a tape;

(b) tape feeding means for delivering tape adjacent to said nozzle for receiving a layer of mastic therefrom including:

(c) a sleeve slidable on said body from a neutral position thereon;

(d) a tape guide extending along said body;

(e) an arm operatively connected to said sleeve and rockably supporting a shaft;

(f) a track paralleling the line of movement of said sleeve on said body, said shaft having a radially extending flexible tip movable into contact with said track by said sleeve and being flexed by said track and travelling therealong as the sleeve is moved in the same direction, the flexing of the tip rocking said shaft about its axis;

(g) a tape penetrating pin extending radially from said shaft and underlying said tape guide, said pin being angularly disposed with respect to said tip so that when the tip is flexed by coming into contact with the track and causes said shaft to rock about its axis, said pin will be swung to penetrate the tape; and (h) whereby further movement of the sleeve and arm in the same direction will cause said pin to advance the tape along the guide and a return movement of the sleeve and arm will cause the tip to reverse its movement along said track and be flexed in the opposite direction and rock said shaft to disengage the pin from the tape so that the pin will ride clear of the tape on its return movement.

2. The combination as set forth in claim 1; and in which (a) said track has a plurality of spaced apart recesses large enough to receive said flexible tip as it is moved by said arm on its return movement;

(b) whereby said sleeve can be moved a partial distance on its return movement and then moved fowardly again for causing said flexible tip to enter the nearest track recess and be flexed for causing said pin to penetrate the tape for moving it a shorter distance along said tape guide.

3. The combination as set forth in claim 1: and in which (a) tape feeding wheels are rotatably supported by said body and disposed adjacent to said nozzle so that the toothed peripheries of said wheels will receive and support the tape at the mastic outlet of the nozzle;

(b) means for delivering mastic through said nozzle and onto the tape, said means being operatively connected to said tape feeding wheels; and (c) whereby a moving of the wheels over a surface will cause the wheels to rotate and actuate said means for forcing mastic onto the tape just prior to said wheels applying the tape and mastic onto the surface.

4. The combination as set forth in claim 1: and in which (a) a rod slidably receives said arm when said sleeve is moved from its neutral position in a direction to advance the tape in the tape guide and during return movement of said sleeve to said neutral position;

(b) tape cutting means; and (c) said tape cutting means being operatively connected to said sleeve by said rod when the sleeve is moved from its neutral position in the opposite direction from that in which it is moved for advancing the tape in the tape guide.

* * * * *